(12) United States Patent
Vollmer et al.

(10) Patent No.: US 9,730,302 B2
(45) Date of Patent: Aug. 8, 2017

(54) SYSTEM AND METHOD FOR CONTROL OF AN ILLUMINATION DEVICE

(71) Applicant: EPHESUS LIGHTING, INC., Syracuse, NY (US)

(72) Inventors: Benjamin David Vollmer, Syracuse, NY (US); George Dederich, Syracuse, NY (US); Christopher D. Nolan, Syracuse, NY (US); Joseph R. Casper, Syracuse, NY (US); Joseph J. Witkowski, Syracuse, NY (US)

(73) Assignee: Ephesus Lighting, Inc., Syracuse, NY (US)

( * ) Notice: Subject to any disclaimer, the term of this patent is extended or adjusted under 35 U.S.C. 154(b) by 0 days.

(21) Appl. No.: 15/392,236

(22) Filed: Dec. 28, 2016

(65) Prior Publication Data

US 2017/0188438 A1    Jun. 29, 2017

Related U.S. Application Data

(60) Provisional application No. 62/271,598, filed on Dec. 28, 2015, provisional application No. 62/271,564, (Continued)

(51) Int. Cl.
*H05B 37/02* (2006.01)
*H04M 1/725* (2006.01)
(Continued)

(52) U.S. Cl.
CPC ...... *H05B 37/0272* (2013.01); *H04M 1/7253* (2013.01); *H05B 33/0854* (2013.01); (Continued)

(58) Field of Classification Search
None
See application file for complete search history.

(56) References Cited

U.S. PATENT DOCUMENTS

| 6,211,626 | B1 | 4/2001 | Lys et al. |
| 6,369,518 | B1 | 4/2002 | Kelly et al. |

(Continued)

FOREIGN PATENT DOCUMENTS

| CN | 202721868 U | 2/2013 |
| CN | 202918552 U | 5/2013 |
| EP | 1528785 A1 | 5/2005 |

OTHER PUBLICATIONS

"How to Choose the Right LED Lightin Product Color Temperature", downloaded from internet Apr. 12, 2014, http://www.seesmartled.com/kb/choosing_color_temperature/.

(Continued)

*Primary Examiner* — Dedei K Hammond
(74) *Attorney, Agent, or Firm* — Fox Rothschild LLP (57) ABSTRACT

A lighting control system includes a control card for an illumination device. The control card receives an input signal from a controller electronic device, identifies a type of the illumination device, and uses the identified type to identify an output signal protocol corresponding to the illumination device. If the input signal uses a protocol that differs from that of the output signal protocol, the control card will convert the input signal to the output signal protocol. The controller device may be programmed to enable a user to display and/or control various parameters of various lighting devices.

20 Claims, 9 Drawing Sheets

Related U.S. Application Data filed on Dec. 28, 2015, provisional application No. 62/395,520, filed on Sep. 16, 2016.

(51) Int. Cl.

| | | |
|---|---|---|
| *H05B 33/08* | (2006.01) | |
| *H04W 4/00* | (2009.01) | |
| *F21V 15/01* | (2006.01) | |
| *F21V 29/74* | (2015.01) | |
| *F21V 21/30* | (2006.01) | |
| *F21S 2/00* | (2016.01) | |
| *F21Y 115/10* | (2016.01) | |

(52) U.S. Cl.
CPC .......... *H05B 37/0218* (2013.01); *F21S 2/005* (2013.01); *F21V 15/01* (2013.01); *F21V 21/30* (2013.01); *F21V 29/74* (2015.01); *F21Y 2115/10* (2016.08); *H04W 4/008* (2013.01)

(56) References Cited

U.S. PATENT DOCUMENTS

| | | | |
|---|---|---|---|
| 6,933,486 | B2 | 8/2005 | Pitigoi-Aron et al. |
| 6,962,423 | B2 | 11/2005 | Hamilton et al. |
| 7,009,641 | B2 | 3/2006 | Takahashi |
| 7,049,768 | B1 | 5/2006 | Zhu et al. |
| 7,161,311 | B2 | 1/2007 | Mueller et al. |
| 7,365,991 | B2 | 4/2008 | Aldrich et al. |
| 7,405,715 | B2 | 7/2008 | Guzman et al. |
| 7,515,128 | B2 | 4/2009 | Dowling |
| 7,924,174 | B1 | 4/2011 | Gananathan |
| 8,227,960 | B2 | 7/2012 | Huang |
| 8,278,846 | B2 | 10/2012 | Roberts et al. |
| 8,358,089 | B2 | 1/2013 | Hsia et al. |
| 8,371,717 | B2 | 2/2013 | Lai |
| 8,456,109 | B1 | 6/2013 | Wray |
| 8,573,801 | B2 | 11/2013 | Artsyukhovich et al. |
| 8,575,861 | B1 | 11/2013 | Gordin et al. |
| 8,649,882 | B2 | 2/2014 | Stelzer et al. |
| 8,760,058 | B2 | 6/2014 | Song et al. |
| 8,766,555 | B2 | 7/2014 | Tu et al. |
| 8,841,859 | B2 | 9/2014 | Chemel et al. |
| 9,101,029 | B2 | 8/2015 | Shamoto et al. |
| 9,167,639 | B2 | 10/2015 | Chen et al. |
| 9,189,996 | B2 | 11/2015 | Casper et al. |
| 9,332,606 | B2 | 5/2016 | Lee |
| 9,345,114 | B2 | 5/2016 | Kim et al. |
| 9,408,271 | B2 | 8/2016 | Casper et al. |
| 2005/0099824 | A1 | 5/2005 | Dowling et al. |
| 2006/0098077 | A1 | 5/2006 | Dowling |
| 2009/0040470 | A1 | 2/2009 | Fukui et al. |
| 2009/0052179 | A1 | 2/2009 | Hammel |
| 2009/0067172 | A1 | 3/2009 | Inoue et al. |
| 2009/0135411 | A1 | 5/2009 | Gordin |
| 2010/0102729 | A1 | 4/2010 | Katzir et al. |
| 2010/0225241 | A1 | 9/2010 | Maehara et al. |
| 2010/0277076 | A1 | 11/2010 | Tracy et al. |
| 2011/0062872 | A1 | 3/2011 | Jin et al. |
| 2011/0089866 | A1 | 4/2011 | Trotter et al. |
| 2011/0095690 | A1 | 4/2011 | Sagal |
| 2011/0260652 | A1 | 10/2011 | Hsieh |
| 2012/0033419 | A1 | 2/2012 | Kim et al. |
| 2012/0043909 | A1 | 2/2012 | Bloom et al. |
| 2012/0153837 | A1 | 6/2012 | Park et al. |
| 2012/0235579 | A1 | 9/2012 | Chemel et al. |
| 2012/0261105 | A1 | 10/2012 | Lin et al. |
| 2012/0326631 | A1 | 12/2012 | Naruo et al. |
| 2013/0033881 | A1 | 2/2013 | Terazawa et al. |
| 2013/0063042 | A1 | 3/2013 | Bora et al. |
| 2013/0077307 | A1 | 3/2013 | Yamamoto |
| 2013/0200796 | A1 | 8/2013 | Song et al. |
| 2014/0062297 | A1 | 3/2014 | Bora et al. |
| 2014/0159583 | A1 | 6/2014 | Bollmann |
| 2014/0203730 | A1 | 7/2014 | Cheng et al. |
| 2014/0204584 | A1 | 7/2014 | Wu |
| 2014/0210368 | A1 | 7/2014 | Lee et al. |
| 2014/0334149 | A1 | 11/2014 | Nolan et al. |
| 2014/0369073 | A1 | 12/2014 | Parker et al. |
| 2015/0054410 | A1 | 2/2015 | Sanders et al. |
| 2015/0082032 | A1 | 3/2015 | Bruce et al. |
| 2015/0167922 | A1 | 6/2015 | Casper et al. |
| 2015/0167937 | A1 | 6/2015 | Casper et al. |
| 2015/0170584 | A1 | 6/2015 | Casper et al. |
| 2015/0173147 | A1 | 6/2015 | Casper et al. |
| 2015/0305120 | A1 | 10/2015 | Wong et al. |
| 2016/0014867 | A1* | 1/2016 | Luk ............ H05B 37/02 315/294 |

OTHER PUBLICATIONS

Zhou Y. et al., "A Remaining Useful Life Prediction Method Based on Conditioning Monitoring for LED Driver", Proceedings of the IEEE 2012 Prognostics and System Health Management Conference (PHM-2012 Beijing) (2012): 1-5. Web.

International Search Report dated Apr. 29, 2013 for PCT/US2012/069442, international filing date Dec. 13, 2012.

\* cited by examiner

SYSTEM AND METHOD FOR CONTROL OF AN ILLUMINATION DEVICE

RELATED APPLICATIONS AND CLAIM OF PRIORITY

This patent document claims priority to: (1) U.S. Provisional Patent Application No. 62/271,564, titled "Universal Controller Module for an Illumination Device," filed Dec. 28, 2015; (2) U.S. Provisional Patent Application No. 62/271,598, titled System and Method for Wireless Control and Monitoring of an Illumination Device," also filed Dec. 28, 2015; and (3) U.S. Provisional Patent Application No. 62/395,520, filed Sep. 16, 2016, titled "Controllers for Interconnected Lighting Devices." This disclosure of each priority application is incorporated into this document by reference.

BACKGROUND

The advent of light emitting diode (LED) based luminaires has provided sports arenas, stadiums, other entertainment facilities, and other commercial and industrial facilities the ability to achieve instant on-off capabilities, intelligent controls and adjustability while delivering excellent light quality, consistent light output, and improved energy efficiency. Because of this, users continue to seek improvements in LED lighting devices. For example, new and improved ways to direct light in multiple directions, and to provide luminaires with high light output in a compact package, are desired.

Generally, the illumination characteristics (such as intensity, color, flux of LED, or the like) of lighting devices may be controlled by a controller card. The controller card receives an input signal from a user interface and/or controller computing devices, via a predetermined protocol compatible with the controller card, and transmits it to an LED lighting device as an output signal, via a protocol compatible with the lighting device and/or the controller card. Hence, for controlling an LED lighting device, the correct input protocol compatible with the controller card and the output protocol compatible with the lighting device and/or the controller card must be known. Different control cards are thus required for controlling different types of lighting devices.

This document describes methods and systems for controlling an illumination device (such as an LED illumination device) directed to solving the issues described above, and/or other problems.

SUMMARY

In an embodiment, a lighting control system includes an illumination device and a control card. The control card includes a processor, and it also includes or can access a computer-readable medium containing programming instructions that, when executed, will cause processor to receive an input signal from a controller electronic device, identify a type of the illumination device, and use the identified type of the illumination device to identify an output signal protocol corresponding to the illumination device. The control card will convert data from the input signal to an output control signal according to the identified output signal protocol, and it will then transmit the output control signal to the illumination device via a wired or wireless connection. Optionally, the illumination device may include a port configured to removably receive the control card.

To identify the type of the illumination device, the system may receive identifying data from the illumination device, and it may use the identifying data to identify the type of the illumination device. To identify the output signal protocol corresponding to the illumination device, the system may receive information comprising one or more of the following features of the illumination device: a DMX address, a DMX personality, an antenna mode, or a wired input control protocol. The control card also may use the received information to identify the output signal protocol. The system of claim 1, wherein the illumination device further comprises a port configured to removably receive the control card.

Examples of different input signal protocols and output signal protocols that the system may apply include, without limitation: a near-field communication protocol; a short-range communication protocol; a cellular network protocol; analog (0-10V); a protocol for adigital addressable lighting interface; that described in the American National Standards Institute ("ANSI") "Entertainment Technology—USITT DMX512-A—Asynchronous Serial Digital Data Transmission Standard for Controlling Lighting Equipment and Accessories", which is commonly referred to a DMX512 or simply DMX; DMX/RDM; streaming ACN; pulse width modulation; $I^2C$; and/or a protocol of a universal asynchronous receiver/transmitter device.

Optionally, to identify the output signal protocol, the control card may access a data set that stores various rule sets for converting data between protocols. The control card may identify one of the rule sets that corresponds to a protocol of the input signal and the output signal protocol, extract the identified rule set from the data set, and execute the extracted rule set to generate the output control signal.

In some embodiments, the system also includes the controller electronic device. The controller electronic device may output a user interface for a control application that, responsive to commands from a user via the user interface, will include in the input signal commands to adjust one or more parameters of the illumination device. In addition, in some embodiments the controller electronic device may receive various parameter values from the illumination device and display the received one or more parameter values on a display of the controller electronic device. Optionally, the controller electronic device may receive a credential from its user, access a data set that includes authorization parameters for user credentials, retrieve the authorization parameters that correspond to the credential of the user of the controller electronic device, and apply the authorization parameters to the control application so that the user interface only permits the user to control the illumination devices or illumination device parameters that are permitted by the authorization protocol.

In some embodiments, the system may include multiple controller electronic devices that may generate input signals according to two or more different communication protocols.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Similarly, the term "comprises" means "includes, and is not limited to."

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

A "controller device" is an electronic device that is configured to execute commands to control one or more other devices, such as illumination devices. A "controller card" or "control card" or "control module" refers to a circuit component that acts as the interface between an input interface (such as an input interface of a controller device) and a lighting device.

A "computing device" or "electronic device" refers to an electronic device having a processor and memory an d/or a communication device that can access a memory device. A communication device of an electronic device may include, for example, a short range wireless communication interface such as a transmitter, a near field communication (NFC) or radio frequency identifier (RFID) tag or Bluetooth Low Energy (BLE) receiver (with reduced transmit power), a processor and non-transitory, computer-readable memory. The memory will contain or receive programming instructions that, when executed by the processor, will cause the electronic device to perform one or more operations according to the programming instructions. Examples of electronic devices include personal computers, servers, mainframes, virtual machines, containers, gaming systems, televisions, and mobile electronic devices such as smartphones, wearable virtual reality devices, Internet-connected wearables such as smart watches and smart eyewear, personal digital assistants, tablet computers, laptop computers, media players and the like. Electronic devices also may include appliances and other devices that can communicate in an Internet-of-things arrangement, such as smart thermostats, home controller devices, voice-activated digital home assistants, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 8.

"Electronic communication" refers to the ability to transmit data via one or more signals between two or more electronic devices, whether through a wired or wireless network, and whether directly or indirectly via one or more intermediary devices.

When this document uses the term "processor" or "processing device," unless expressly stated otherwise it is intended to include embodiments that consist of a single data processing device, as well as embodiments that include two or more data processing devices that together perform various steps of a described process.

When this document uses the terms "memory," "memory device," of i "data storage facility," unless expressly stated otherwise it is intended to include embodiments that consist of a single memory device, embodiments that include two or more memory that together store a set of data or instructions, or a sector or other portion of a memory device.

When this document uses the term "card" (such as in the context of a "control card"), it is not intended to limit the structure to the actual physical structure of a card. Instead, the term "card" refers to a module containing electronic components and a housing and/or substrate that is configured to be removably interconnected to various types of lighting devices.

Figure 1:
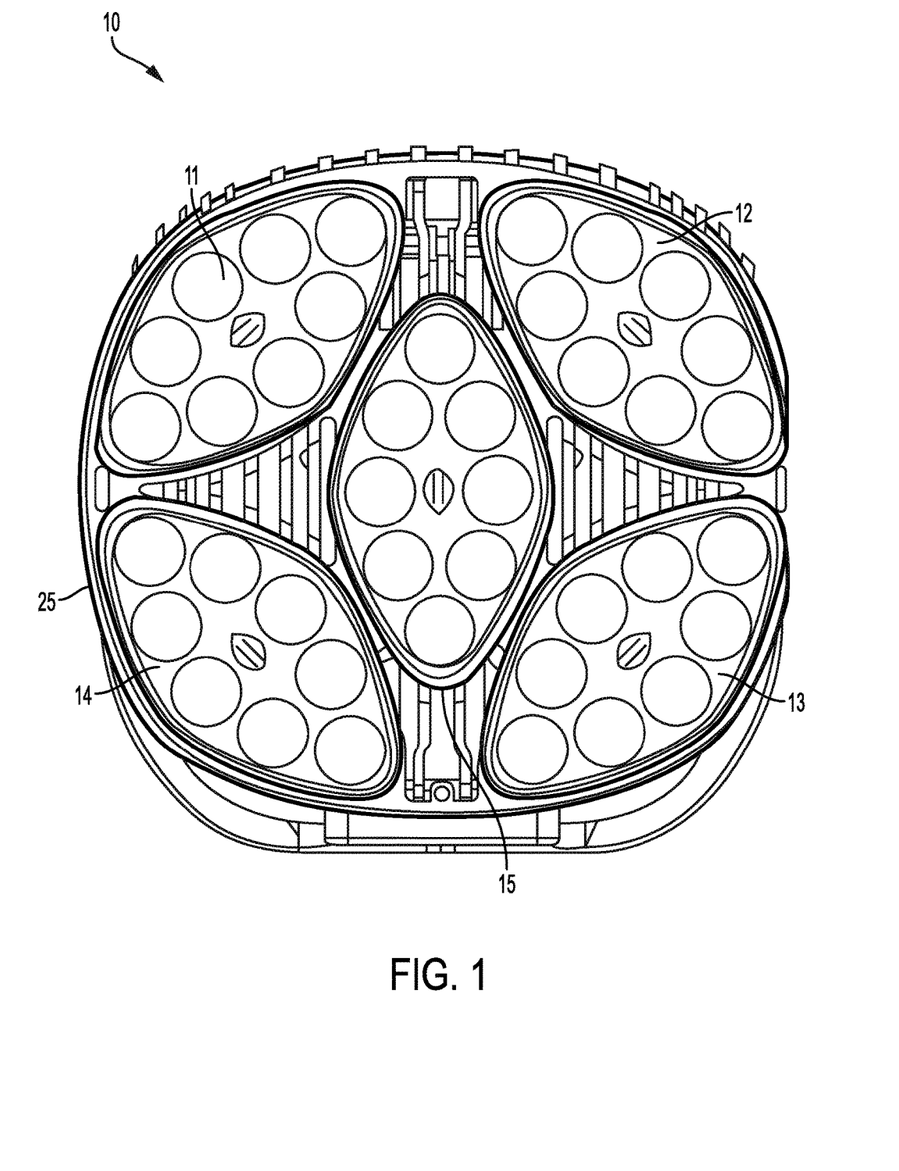
FIG. 1 illustrates a front view of an example of one embodiment of an illumination devices.
Figure 2:
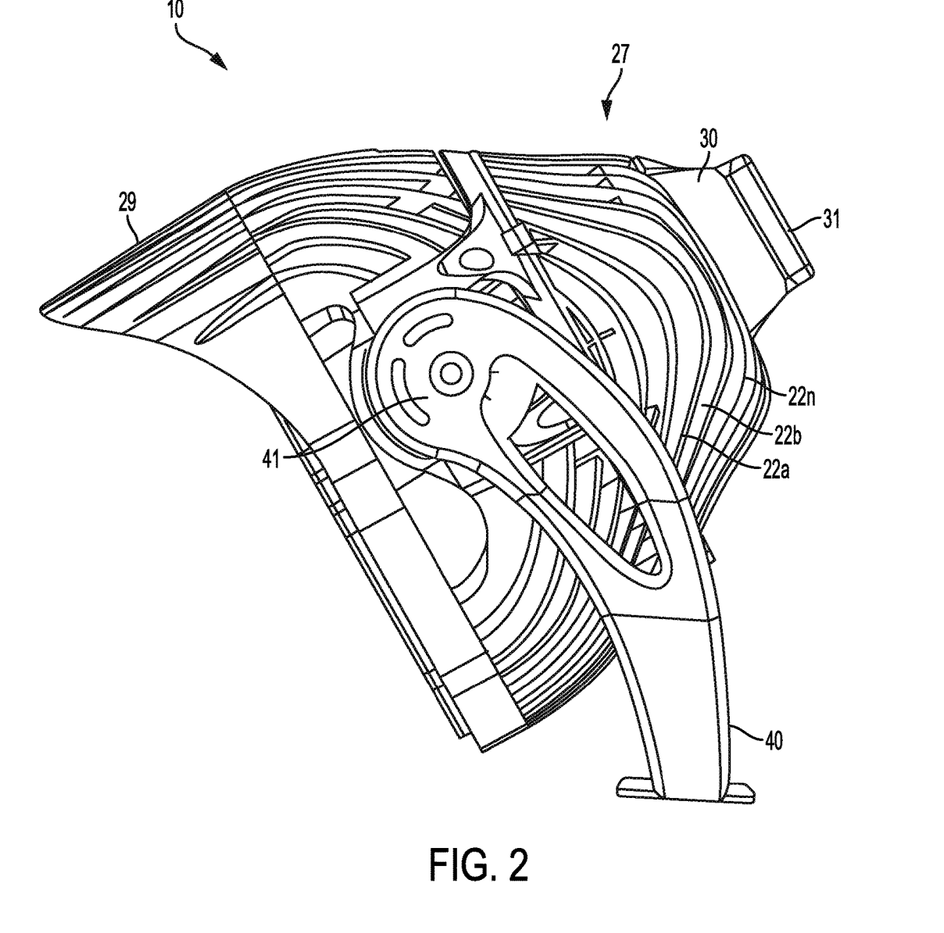
FIG. 2 illustrates a view from one side of the device of FIG. 1.

FIG. 1 illustrates a front view of an example of an illumination device 10, which also may be referred to as a lighting device or a light fixture. FIG. 2 illustrates a view from one side of the device of FIG. 1, while FIG. 2 provides a perspective view. The illumination device 10 includes a housing 25 that encases various components of a light fixture. As shown in FIG. 1, the housing 25 includes an opening in which a set of light emitting diode (LED) modules 11-15 are secured to form a multi-module LED structure. The LED modules 11-15 are positioned to emit light away from the fixture. Each LED module includes a frame that holds a set of LEDs arranged in an array or other configuration. In various embodiments the number of LEDs in each module may be any number that is sufficient to provide a high intensity LED device. Each LED module will also include a substrate on which the LEDs, various conductors and/or electronic devices, and lenses for the LEDs are mounted.

The opening of the housing 25 may be circular, square, or a square with round corners as shown in FIG. 1, although other shapes are possible. The LED modules 11-15 may include five modules as shown, with four of the modules 11-14 positioned in a quadrant of the opening and the fifth module 15 positioned in the center as shown. Alternatively, any other number of LED modules, such as one, two, three, four or more LED modules, may be positioned within the opening in any configuration.

The device's housing 25 includes a body portion 27 and an optional shroud portion 29. The body portion 27 serves as a heat sink that dissipates heat that is generated by the LED modules. The body portion 27 may be formed of aluminum and/or other metal, plastic or other material, and it may include any number of fins 22a . . . 22n on the exterior to increase its surface area that will contact a surrounding cooling medium (typically, air). Thus, the body portion 27 or the entire housing 25 may have a bowl shape as shown, the LED modules 11-15 may fit within the opening of the bowl, and heat from the LED modules 11-15 may be drawn away from the LED modules and dissipated via the fins 22a . . . 22n on the exterior of the bowl.

While the LED modules are positioned at the front of body portion 27, the opposing side of the body portion may be attached to a power supply 31, optionally via a thermal interface plate. The power supply 30 may include a battery, solar panel, or circuitry to receive power from an external and/or other internal source. The power supply 30 may be positioned at the rear of the body (i.e., at the bottom of the bowl), and the interior of the unit may include wiring or other conductive elements to transfer power and/or control signals from the power supply unit 30 to the LED modules 11-15. The power supply 30 may be positioned at or near the rear of the body as shown, or it may be placed into the housing so that it is flush or substantially flush with the rear of the body portion 27, or it may be configured to extend to some point between being flush with the body portion 27 and an extended position. A sensor cavity 32 may be attached to the power supply and/or other part of the device as shown, and it may contain sensors and/or control and communications hardware for sensing parameters of and controlling the device, receiving commands, and transmitting data to remote control devices.

The housing 25 may be formed as a single piece, or it may be formed of two pieces that fit together as in a clamshell-type structure. In a clamshell design, a portion of the interior wall of the clamshell near its opening may include a groove, ridge, or other supporting structure that is configured to receive and secure the LED structure in the opening when the clamshell is closed. In addition, the fins 22a . . . 22n may be curved or arced as shown, with the base of each fin's curve/arc positioned proximate the opening/LED modules, and the apex of each fin's curve/arc positioned distal from the opening/LED modules to further help draw heat away from the LED modules. The housing may be attached to a support structure 40, such as a base or mounting yoke, optionally by one or more connectors 41. As shown, the connectors 41 may include axles about which the housing and/or support structure may be rotated to enable the light assembly to be positioned to direct light at a desired angle.

The power supply unit 30 may be detachable from remainder of the lighting device's housing 25 so that it can be replaced and/or removed for maintenance without the need to remove the entire device from an installed location, or so that it can be remotely mounted to reduce weight. The power supply 30 and/or a portion of the lighting unit housing 25 may include one or more antennae, transceivers or other communication devices that can receive control signals from an external source. For example, the illumination device may include a wireless receiver and an antenna that is configured to receive control signals via a wireless communication protocol. Optionally, a portion of the lighting unit housing 25 or shroud 29 (described below) may be equipped with an attached laser pointer that can be used to identify a distal point in an environment to which the lighting device directs its light. The laser pointer can thus help with installation and alignment of the device to a desired focal point.

FIGS. 1 and 2 show that the device may include a shroud 29 that protects and shields the LED modules 11-15 from falling rain and debris, and that may help direct light toward an intended illumination surface. The shroud 29 may have any suitable width so that an upper portion positioned at the top of the housing is wider than a lower portion positioned at the bottom and/or along the sides of the opening of the housing. This may help to reduce the amount of light wasted to the atmosphere by reflecting and redirecting stray light downward to the intended illumination surface. FIG. 2 illustrates that in an embodiment, some or all of the fins of the housing 22a-22n may be contiguous with fin portions 23a-23n that extend across the shroud 29. With this option, the shroud 29 can also serve as part of the heat sink.

The fins 22a . . . 22n may be positioned substantially vertically (i.e., lengthwise from a top portion of the LED array structure and shroud 29 to a bottom portion of the same). Optionally, one or more lateral supports may be interconnected with the fins to provide support to the housing. The lateral supports may be positioned substantially parallel to the axis of the fins, or they may be curved to extend away from the LED structure, or they may be formed of any suitable shape and placed in any position. Each support may connect two or more of the fins. The fins and optional supports form the body portion 27 as a grate, and hot air may rise through the spaces that exist between the fins and supports of the grate. In addition, precipitation may freely fall through the openings of the grate. In addition, any small debris (such dust or bird droppings) that is caught in the grate may be washed away when precipitation next occurs.

In an embodiment, the illumination device may also include a means for interfacing with a control card (not shown here). Examples may include without limitation, pogo pins, USB interface, or other similar now or hereafter known techniques.

Figure 3:
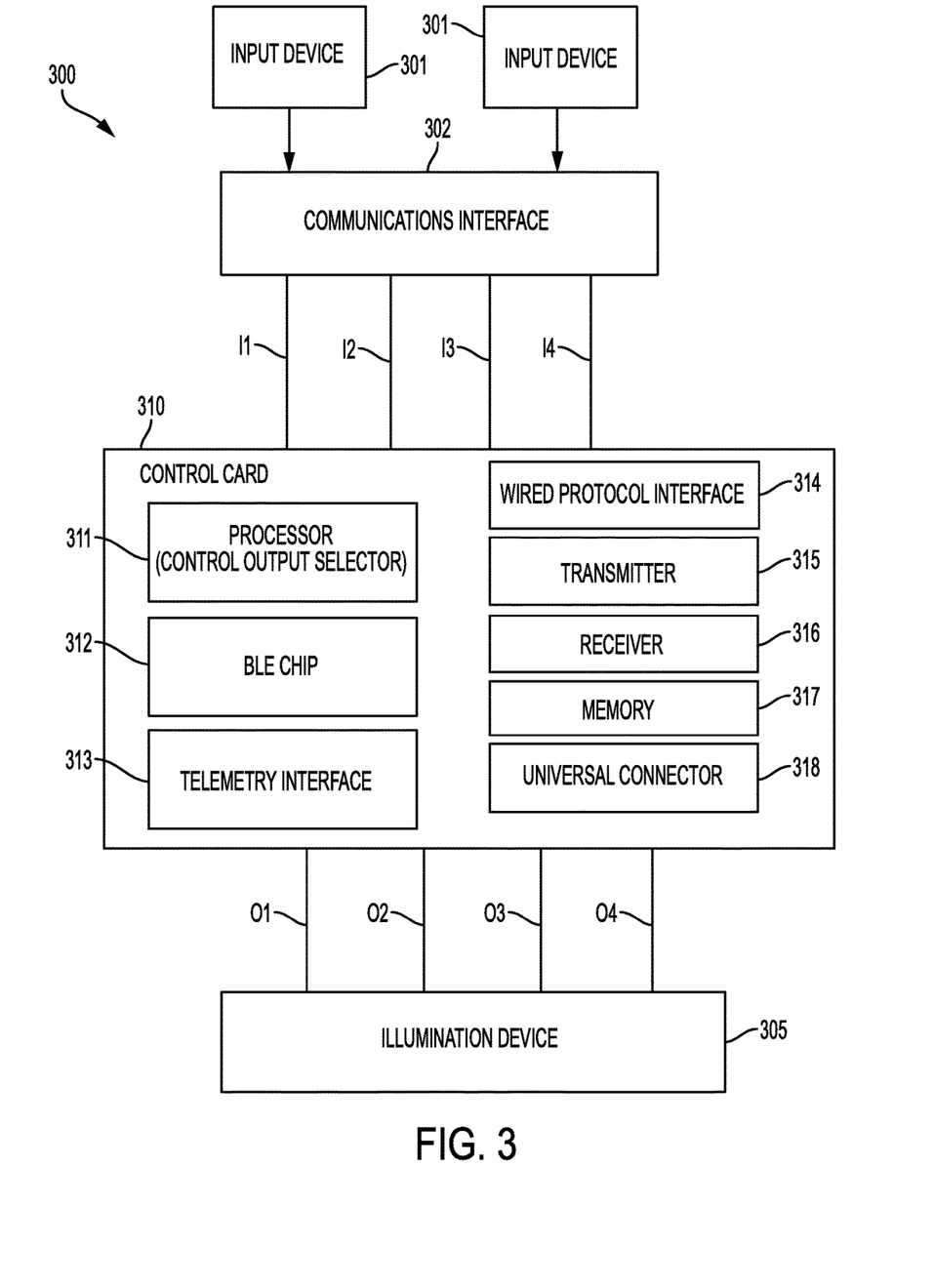
FIG. 3 is a block diagram that illustrates various elements that may be included in a system for controlling an illumination device.

FIG. 3 is a block diagram that illustrates various elements of a system for controlling an illumination device, such as that of FIG. 1 and FIG. 2, using a universal control card, according to an embodiment. Various devices in the system may communicate with each other via one or more communication protocols and/or networks. Examples may include, without limitation, WiFi, short-range communications such as RFID, Bluetooth™ or Bluetooth™ low energy (BLE), cellular networks, Zigbee™, past and future versions of such protocols, and other similar networks and/or protocols. Additionally and/or optionally, various of the devices may communicate the lighting devices via one or more lighting system control signal protocols such as analog (0-10V), digital addressable lighting interface (DALI™) digital multiplex (DMX512), DMX/RDM (wired and/or wireless n), sACN (also known as Streaming ACN), pulse width modulation (PWM), I²C, a near-field or short-range wireless communication protocol (BLE, Zigbee™, etc.) and other protocols, or via one or more devices such as a universal asynchronous receiver/transmitter (UART) device or DC or AC wires. Other protocols may include:

Copper 10/100/1000 Ethernet (also known as 1000Base-T or GigE) media:
Streaming Architectural Control Network (sACN or E1.31) protocol
Art-Net protocol
Streaming remote device management (RDM) (e.g., E1.33) protocol Single mode fiber or multi-mode fiber such as Fiber 100/1000 Ethernet (via SFP—Small Form-factor Pluggable—transceivers to adapt to a variety of single-mode and multi-mode fiber standards):
  Streaming Architectural Control Network (sACN or E1.31) protocol
  Art-Net protocol
  Streaming RDM (e.g., E1.33) protocol
  RS-485
  DMX (i.e., any digital multiplex protocol such as DMX-512A
  RDM DMX (i.e., DMX enhanced with remote device management, sometimes known as a DMX-RDM one-port gateway)
  Wireless/Radio frequency (RF)
  DMX
  RDM DMX Other media and communication protocols may be used in various embodiments, such as RS422, RS232, RS423, and the like.

The system may include one or more input devices 301 that may generate control signals for controlling an illumination device. The input devices 301 may include a user interface such as a touch screen, a keyboard or keypad, or a microphone and speech-to-text programming Each input device may server The system may also include a communications interface 302 for transmitting the input signal generated by the input devices 301 to a control card 310. In an embodiment, the communications interface 302 provides for electrical communication between the input devices 301 and control card 310. The communications interface 302 may use any suitable communication protocols for transmitting input lighting control signals, including but not limited to those listed above. The communications interface may be a component of the input device 301 (such as a transmitter or communications port), or it may be a separate device.

The control card 310 is compatible to receive all of the control signals I1, I2, I3, I4 according to several of the lighting system control signal protocols, such as those listed above. The control card may include a receiver 316 and/or a wired protocol interface 314 that enable the control card to receive either or both of wireless and wired input signals.

In an embodiment, the control card 310 may also include a processor 311 that monitors both wired (314) and wireless communication interfaces (receiver 316) and responds to each of them based on the input commands. The processor 311 may include one or more rule sets for optimally monitoring input signals at both interfaces. For example, the control card 310 may be configured to stop monitoring the wireless communication interface (receiver 316) upon receiving an input signal at the wired protocol interface 314. The control card 310 may then again begin monitoring the wireless communication interface (receiver 316) after a certain time after the last wired command was received. In an example embodiment, the time may be 10 seconds, 20 seconds, or any other suitable time.

In an embodiment, the control card 310 may also include a processor 311 that is in electronic communication with a control input selector. The control output may receive identifying data from an illumination device, upon startup, and may then select a type of the control output protocol compatible with an illumination device based on the received identifying data. The control card 310 may save the illumination device identification and the identified control output protocol in a memory 317 for future reference. In an embodiment, the control card 310 may refresh some or all of the saved information every time upon startup of the illumination device.

In an embodiment, the control card 310 may also include a wired communication interface 314 and a wireless communication transmitter 315, for transmitting the output control signal to an illumination device 305 using the control signal protocol that is retrieved from memory for the device. Any of the lighting system control signal protocols listed above, or other protocols, may be used for the output control signal. The system will store various rule sets for processing communication packets or other data structures of the input signal and converting the input signal data to an output control signal of the required protocol for the lighting device. The system may access the data set containing the rule sets and identify one of the rule sets that corresponds to a protocol of the input signal and the desired output signal protocol. It will then extract a copy of that rule set from memory and execute the extracted rule set to generate the output control signal. Alternatively, the system may include control circuitry for converting the signals from one protocol to another protocol.

The transmitter 315 and the receiver 316 of the control card 310 may be separate devices, or they may be components of a single device such as a transceiver. Alternatively and/or additionally, the control card 310 may include a universal connector for physically connecting to one or more types of wireless communication radios (or a transceiver), such as a DMX/RDM radio. In an embodiment, the universal connector provides one or more pinouts (i.e., the power, ground, communication bus, etc.) that match pinouts of one or more types of wireless communication radios.

In some embodiments, the control card 310 may also include a near-field communication circuit (such as BLE chip 312) in electrical communication (such as $I^2C$ communication bus) with the processor 311. The BLE chip 312 may provide a BLE interface to communicate with a mobile device. The BLE chip 312 may receive communications, via the BLE interface, from a mobile device for adjusting various input and/or output protocol parameters of the control card 310. Examples of such parameters may include, without limitation, DMX address, DMX personality of an illumination device, antenna mode settings, and power supply telemetry data. In an embodiment, the BLE chip 312 may use the received parameter information to adjust a DMX address, DMX personality of an illumination device, an antenna mode, a wired input control protocol, enable and/or disable a power supply, and/or the like. In an embodiment, the BLE chip may also be used for initial illumination device setup. In an embodiment, the control card 310 may also include a universal telemetry interface for receiving telemetry data from different types of illumination devices. As, discussed above, the control card 310 may identify a type of illumination device upon start up. The control card may use the identified type to select an appropriate electrical communication channel (such as $I^2C$, RS485, or the like) to receive telemetry data from an illumination device. Telemetry data may include data corresponding to one or more measured quantities measured using one or more sensors of an illumination device. In an embodiment, the control card 310 may transmit the received telemetry data to a controller device.

Figure 4:
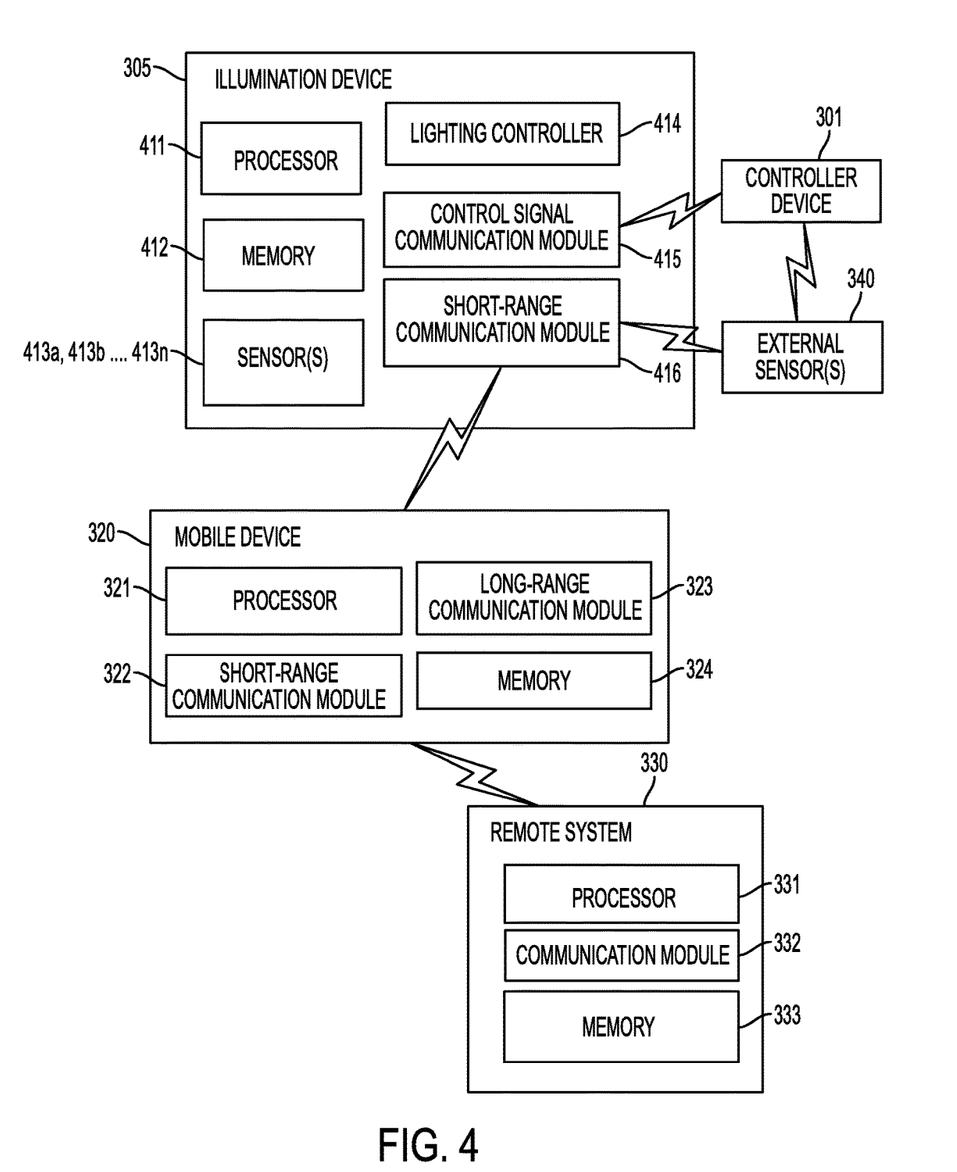
FIG. 4 is a block diagram that illustrates additional elements that may be included in a system for controlling various illumination devices.

FIG. 4 is a block diagram that illustrates various elements of a system for providing wireless control of an illumination device such as that of device 305 of FIG. 3, according to an embodiment. Various devices in the system may communicate with each other via one or more communication protocols and/or networks, as previously described. In an embodiment, an illumination device 305 includes electronic components that may include, without limitation, a processor 411, a memory 412, one or more sensor modules (413a, 413b, . . . 413n), a lighting controller 414 (such as a control card), a control signal communication module 415 including components such as an antenna for receiving control signals, and a short-range communication module 416 including components such as a receiver and/or transmitter for receiving and/or transmitting control signals. One or more of the above components of an illumination device 305 may be in electrical communication with each other via a protocol such as I²C, RS485, serial peripheral interface (SPI), UART, or the like. Examples of the short-range communication module 416 may include now or hereafter known modules for enabling short-range communications such as BLE, NFC, RFID, Zigbee, or the like.

The system may include one or more controller devices 301 that may generate control signals for controlling an illumination device 305. Examples of controller devices 301 may include, without limitation, an electronic device having a user interface such as a smart phone, tablet computing device or other computing device; a home voice assistant or other voice-controllable electronic device; a dedicated lighting control device such as a dimmer switch, or the like. A controller device 301 may be a remote computing device that may provide monitoring and controlling capabilities for an illumination device 305. In an embodiment, a controller device 301 may transmit control signals to a control signal communication module 415 of an illumination device 305 via one or more of control signal protocols discussed above. In an embodiment, a controller device 301 may also receive telemetry data such as sensor data, power supply data, lighting control information, external sensor data, or the like, from a control signal communication module 415 of an illumination device 305, via one or more control signal protocols.

In an embodiment, the system may also include one or more external sensors 340. In an embodiment, the external sensors 340 may communicate (transmit and/or receive external sensor data or other information) with a short-range communication module 416 of an illumination device 305, via, for example a BLE protocol. Examples of external sensors may include, without limitation, light intensity sensors, color temperature sensors, $D_{uv}$ sensors, color temperature (CCT) sensors, color rendering index (CRI) sensors, and/or ambient air temperature sensors. In certain embodiments, an external sensor 340 may also communication with a controller device 301.

In an embodiment, a lighting controller 414 of an illumination device 305 may receive data and/or instructions from the sensors (internal and/or external), a mobile device, and/or a controller device, and use the received data and/or instructions to change one or more characteristics of light from the illumination device. For example, if an ambient air temperature sensor detects that the temperature in the vicinity of the LED array module exceeds a threshold, the lighting controller may cause the LEDs to dim by reducing the voltage output of each transformer and/or reducing the duty cycle of the LEDs in the module. If a light sensor detects that an ambient light level is above a desired range, the control circuitry may automatically reduce the brightness of a group of the LEDs by decreasing a width of voltage pulses applied to the group of LEDs or increasing spacing between voltage pulses applied to the group of LEDs to maintain the ambient light level within the desired range. If the light sensor detects that the ambient light level is above (or below) a desired threshold, the control circuitry may automatically reduce (or increase) increase the brightness a group of the LEDs by reducing (or increasing) a width of voltage pulses applied to the group of LEDs, or by increasing (or decreasing) spacing between voltage pulses applied to the group of LEDs to maintain the ambient light level within a desired range.

Examples of sensor modules (413a, 413b . . . 413n) may include, without limitation, a light sensor module, a pressure sensor module, an orientation sensor module (including orientation sensors such as an accelerometer, a gyroscope, a magnetometer, or the like), a humidity sensor module, and a temperature sensor module.

In an example embodiment, a processor 411 of the illumination device 305 may receive data the sensor module(s) and/or external sensor(s) and generate data for delivery to another device such as a controller device, a mobile device, or the like. The generated data may be the received data, or it may be processed data that results from the processor performing one or more operations on the received data as described below.

The system may also include an electronic device such as mobile device 320 that includes a short-range communication module 321 (including a receiver and/or a transmitter, such as an antenna) that is configured to receive and/or transmit information and/or data from a short-range communication module of an illumination device 305 and/or other devices. The mobile device 320 may also include a processor 321 and a memory 324. The mobile device 320 may also include a long-range communication module 323 for enabling long-range communications such as Wi-Fi, cellular, Internet, Intranet, wired Ethernet, or the like.

In an embodiment, the mobile device may also include a user interface (not shown here) to transmit to and/or receive instructions from a user of the mobile device. Example may include, without limitation, a display, a microphone, a touchscreen, an audio interface, or the like. Other hardware that may be included in mobile devices will be discussed below in the discussion of FIG. 8.

The system also includes a computer-readable medium containing programming instructions that, when executed, will cause the illumination device's processor 411, the mobile device processor 321, both processors and/or other processing devices to monitor, control, configure, and/or update the illumination device. The computer-readable medium may be a memory 412 of the illumination device 305, a memory 324 of mobile device 320, or a memory 333 of another device such as a remote system 330 that is in communication with the mobile device 320.

The remote system 330 is in electronic communication with the mobile device and/or the illumination device and may include features such as a communication module 332, processor 331, and a memory 333 (such as a data storage facility).

In an embodiment, an illumination device 305 of the system may receive control signal from a controller device 301 and/or a mobile device 320.

Figure 5:
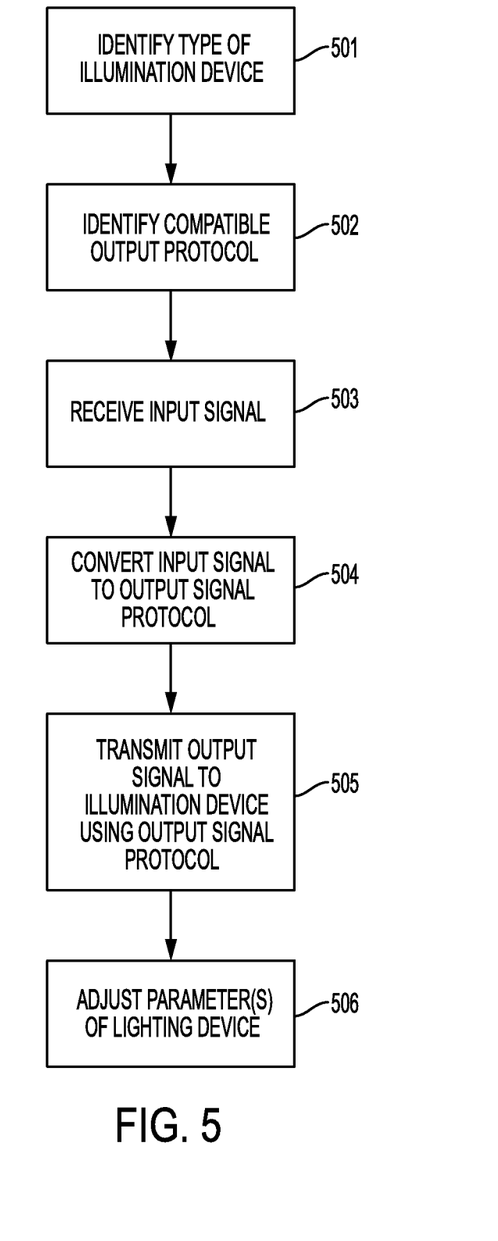
FIG. 5 illustrates a flowchart an example method for controlling an illumination device, according to an embodiment.

FIG. 5 illustrates a flowchart corresponding to an example method for controlling an illumination device using a universal control card, according to an embodiment. In step 501, the system may identity a type of an illumination device based on identifying data received from the illumination device. Example of identifying data may include, without limitation, a type identifier, manufacturer identifier, model number, and other similar information. The system may then identify 502 a control signal protocol that is compatible with the illumination device based on the identified type of the illumination device, such as by referring to a data set in which device types and their control signal protocols are associated. Thus, in an embodiment, the control card may consult an internal and/or external dataset to select the appropriate control output protocol for the identified illumination device. The system may receive an input signal from an input device in step 503, convert the input signal to an output signal according to identified output control signal protocol 504, and use the identified output protocol to transmit 505 an output control signal to the illumination device. The input device may be a controller device and/or other electronic device (e.g., elements 301 and 320 of FIGS. 3 and 4). The illumination device may implement a command 506 based on the output control, such as a command to adjust any of the parameters that will be described below.

Figure 6:
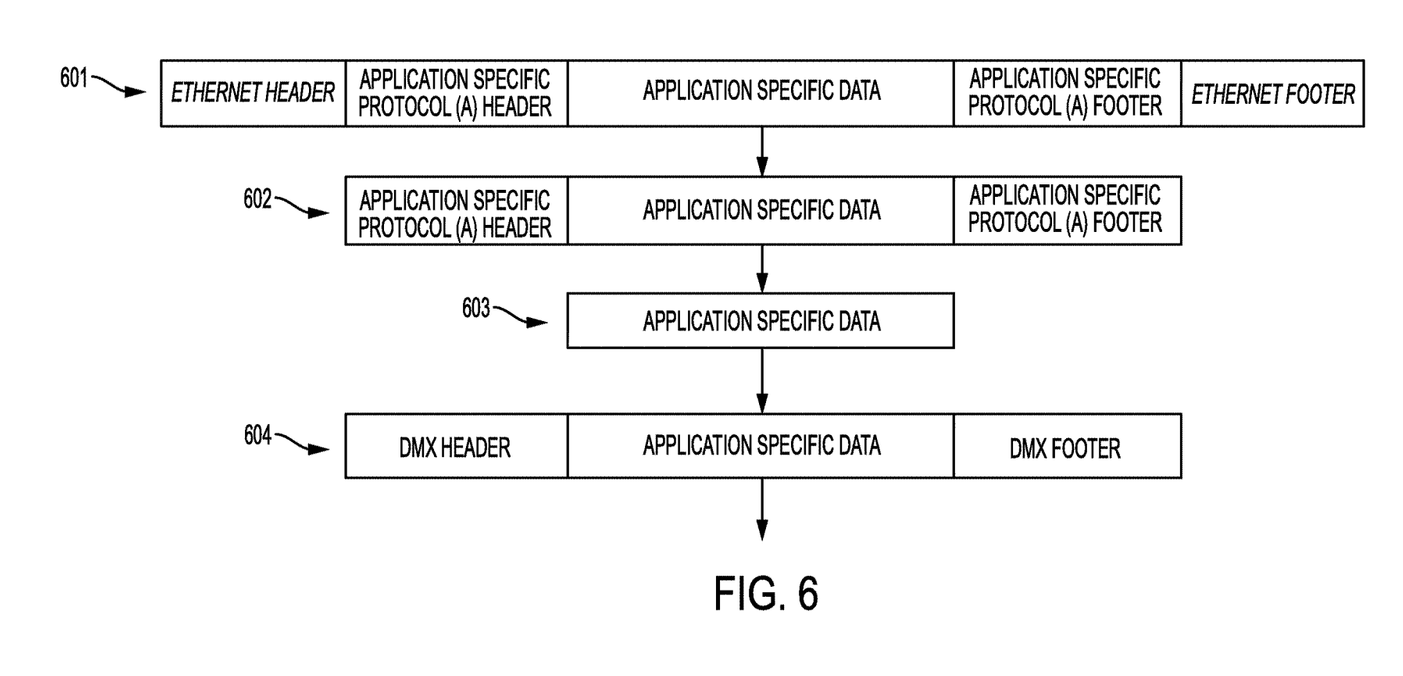
FIG. 6 illustrates an example process of converting a data frame from a first communication protocol to a second communication protocol.

The conversion can be handled either by a processor of either the control card or a central controller. Referring to FIG. 6, the processor may execute programming instructions code to extract a data frame of the first protocol from the received packet (step 601), leaving the packet's header and footer behind. The processor may then extract application specific data from the frame (step 602) to yield the application specific data (step 603). The system may then add appropriate headers for the output signal protocol (step 604).

Figure 7A:
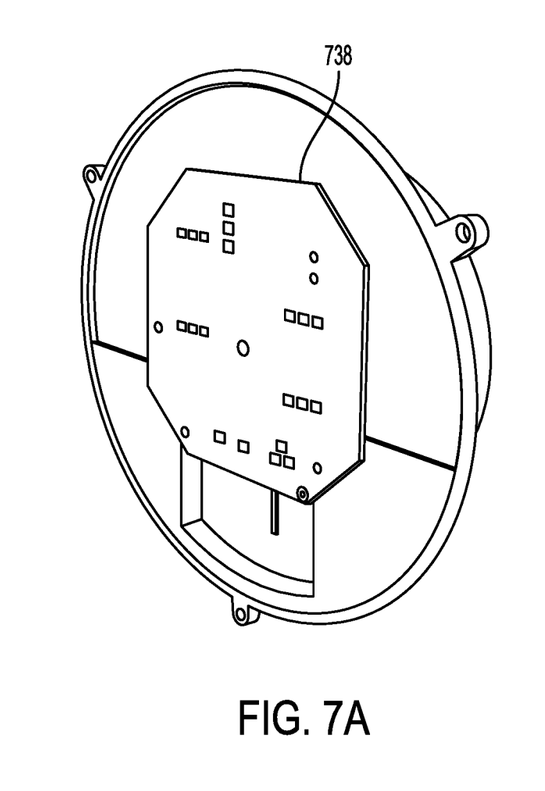
FIG. 7A and FIG. 7B illustrate an example substrate of an illumination device including an control card, according to an embodiment.
Figure 7B:
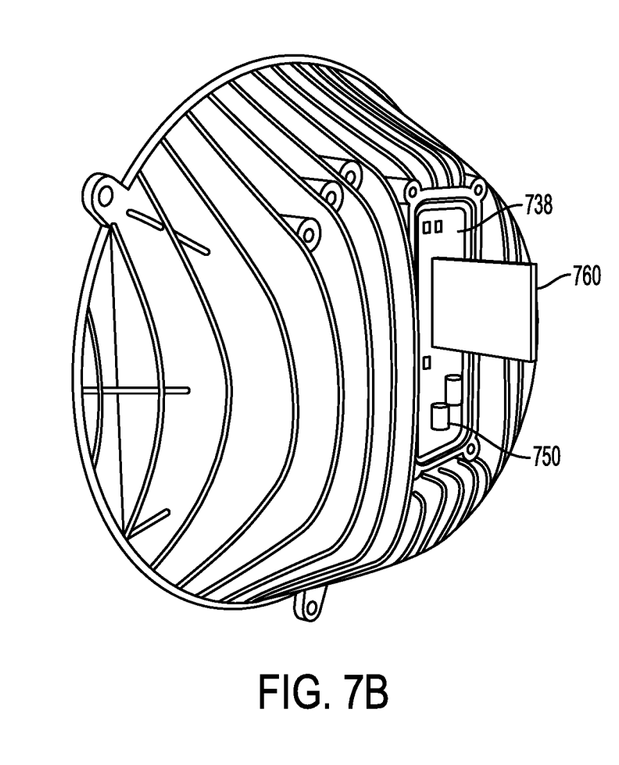

As shown in FIG. 7A, and FIG. 7B, in an embodiment, one or more electronic components 750 may be located on or near a substrate 738 of an illumination device. As shown, the illumination device includes a conductive substrate 738 on which a number of LEDs are positioned. The substrate 738 may be in electrical communication with a control card 760 (having capabilities such as those described above) and other components such as an orientation sensor module. The control card may be programmed with rules for various input signal-to-output signal protocol conversions. Different cards may be programmed to hold different conversion rule sets, and the control card may be inserted into a port of the lighting device so that it can be replaced of protocol changes require updates to the rule set.

The systems shown above may be used to transmit various commands from a controller device to a communication device in any of multiple protocols. In an embodiment, a controller electronic device of the system may execute a control application that may allow a user of the electronic device to monitor, control, configure, and/or update an illumination device, via the electronic device, or provide other capabilities to a user of the electronic device. In this document, the terms "control application" or "control software" refer to a software application that is configured to cause an electronic device to perform some or all of, communication with, monitor, control, configure, and/or update an illumination device, as described in this disclosure. The electronic device may have a control application pre-configured. Alternatively and/or additionally, a user of the electronic device may download and install a control application onto the electronic device. The user may acquire the application by downloading it from an application store or from an illumination device provider. The control application may be of a type which may run on any suitable underlying operating system or platform. The installed control application may register itself with the electronic device's operating system allowing the application to monitor certain activities on the device's operating system, and using the functionalities of the operating system.

The control application may correspond to a local application which executes on the electronic device. Alternatively, the control application may serve as a client app (such as a browser) to interface with a server-side app (such as a web-based application) which executes on a remote application server. That is, the control application may include any application functionality which is accessed by the user over a network and experienced locally as application e.g., using a browser running on the mobile device. The control application may include a database of information. In certain embodiments, the database may be exported to another local device or to a remote, cloud-based repository.

In various embodiments, the control application may enable the electronic device to send various commands to various lighting devices via the input signals. The commands may include, without limitation, commands to change various parameters of the devices, including but not limited to any or all of the following:

set or read an LED driver version, serial number, or other identifier;
set or read a light fixture control mode;
read error codes;
clear error codes;
read average and/or peak DC current;
read load VDC;
read average load power;
read lifetime load watt-hours;
read lifetime powered to date (in seconds or other units of time measurement);
read current LED driver board temperature;
read peak LED driver board temperature;
clear (reset) the LED driver board peak temperature;
read power width modulation (PWM) output duty from each module;
set or read the number of LED modules in the lighting device;
reset the power board;
enable and/or disable a low power mode;
set or read Fixture serial number;
set or read the color or CCT of each LED module;
set or read a flag indicating whether an attached wireless controller should use an external or internal antenna;
EEPROM Reset/Restore;
set or read absolute maximum duty cycle of output PWM for each LED module;
set or read PW1 output for any module in $I^2C$ (or other suitable) control mode;
set or read the maximum limit for the average output across all populated LED modules;
set or read the maximum rate of change of a light output (limits the speed that light output responds to a step change in the control input);
set or read the temperature limit before thermal fallback;
set or read the temperature fallback mode;
set or read the temperature fallback increment;
set or read the temperature fallback evaluation rate;
set or read the return to operation temperature;
set or read the power up delay time;
set or read the power up light output ramp;
set or read the power up behavior;
write LED driver firmware update data;
read data from the humidity and temperature sensor;
read data from the pressure sensor;
read data from the light sensor;
read data from the orientation sensor; and
set or read the address of the primary lighting controller.

The control application also may include instructions to cause the controller electronic device to receive values of any of the parameters listed above from the lighting device and output those values on a display screen or other user interface. In an embodiment, the control application may be configured to enable a single electronic device to control, monitor, update, configure, etc. more than one illumination device. The control application also may provide a notification to a user when it detects that an illumination device is within a communications range of the electronic device that is running the control application. For example, a communications interface of an illumination device may continuously emit ping messages which may be received by a mobile device when it is within a receiving range. Alternatively and/or additionally, the control application may cause the electronic device to continuously emit ping messages which may be detected by an illumination device upon receipt of a reply message.

Figure 8:
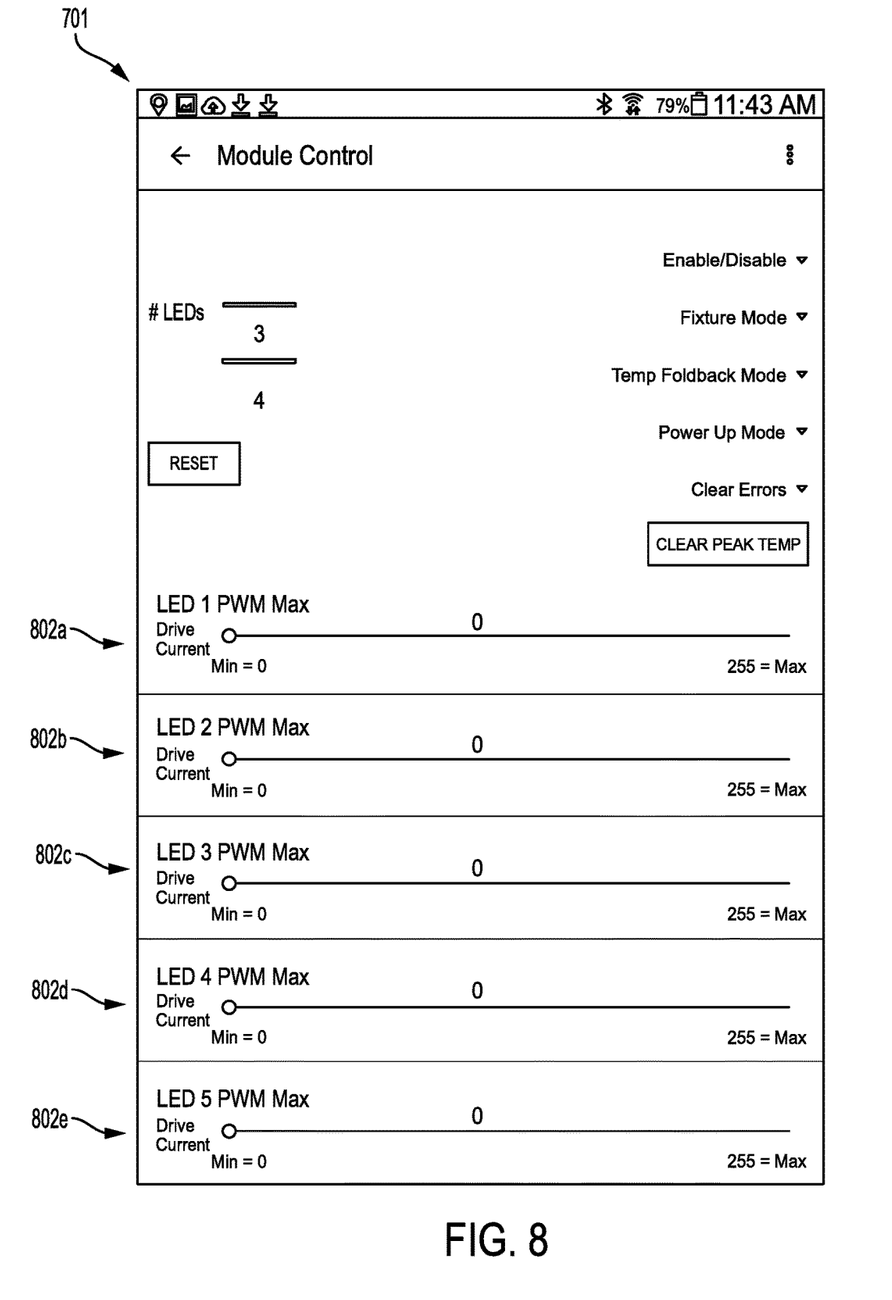
FIG. 8 illustrates an example electronic device user interface that can be used to control various illumination devices.

FIG. 8 illustrates an example user interface display screen 801 by which a user may control various parameters of various illumination devices. As illustrated in FIG. 8, the screen includes control selectors for any number of lighting devices 801a . . . 801e. In this example, the selectors are sliders by which a user can adjust the pulse width modulation applied to any device. Other types of selectors (such as data entry fields, drop-down menus and the like) and other control parameters (such as those listed above) may be used in various screens of the user interface 801. When the user adjusts any parameters, the command may be transmitted to the illumination device, and its protocol converted if necessary into a protocol suitable for the target illumination device, using procedures such as those described above.

In another embodiment, the control application may provide user authentication measures and only allow a user to interact with an illumination devices (or parameters of illumination devices) that the user is authorized to interact with. In this way, users may be given control over all illumination devices, control over illumination devices in a particular location, or control over only certain features of illumination devices in a location. Each user may be required to enter a credential in the electronic device. On receipt of the credential, the control application may cause the device to look up an authorization table, user profile or other data structure and retrieve identifiers for the lighting device and/or parameters that the identified user is authorized to control. For example, the control application may access a locally or remotely stored data set that includes authorization parameters for credentials of various users, and retrieve the authorization parameters that correspond to the credential of the user of the controller electronic device. The control application will then apply the authorization parameters to the control application so that the user interface only permits the user to control the illumination devices and/or parameters that are permitted by the authorization parameters. Optionally, the user interface may only display those devices and/or parameters which the user is authorized to control; alternatively, the user interface may display all available devices and parameters, but only disable the control functionality in the user interface for devices and parameters that the user is not permitted to control.

In an embodiment, the control application may cause the electronic device to automatically store data received such as telemetry data, illumination device status information, or the like in the electronic device's memory and/or when a communication network is available) a remote system memory. A user may access such information at any time via a user interface of the electronic device for purposes of quality control logistics, control of an illumination device, monitoring, manufacturing process management, update, or the like.

In an embodiment, an administrator may set up a configuration file for an illumination device before, during or after manufacture. For example, in manufacturing, when a new illumination device is being built, a user may scan a barcode or select a light personality file from a list of defaults. The parameters dictated by this input may be loaded into the new illumination device and into a configuration file. The illumination device is entered into a location in the configuration file (such as an end use location or an interim location). Data about the LED modules (number of module, color, CCT, or the like) are loaded into the illumination device for later retrieval by for example, a controller device. The light is controlled through a test sequence, and the results are stored in the configuration file.

Such a configuration file other may be useful at, for example, during light commissioning time. It can be used to update fixture parameters or software. It can be used to command the fixture to self-identify (blink). It can be used to set the address of the fixture within a controller device. It can be used for feedback on the AC voltage being fed to the lights, or the temperature of the environment.

Furthermore, after installation of the illumination device in an environment where it will be used, the configuration file along with the received telemetry data and other information (as discussed above) may be used to control the illumination device output, to update software or parameters, to retrieve telemetry data, or to relay data from other devices (wearables, light level and quality sensors, etc.) to other systems.

Figure 9:
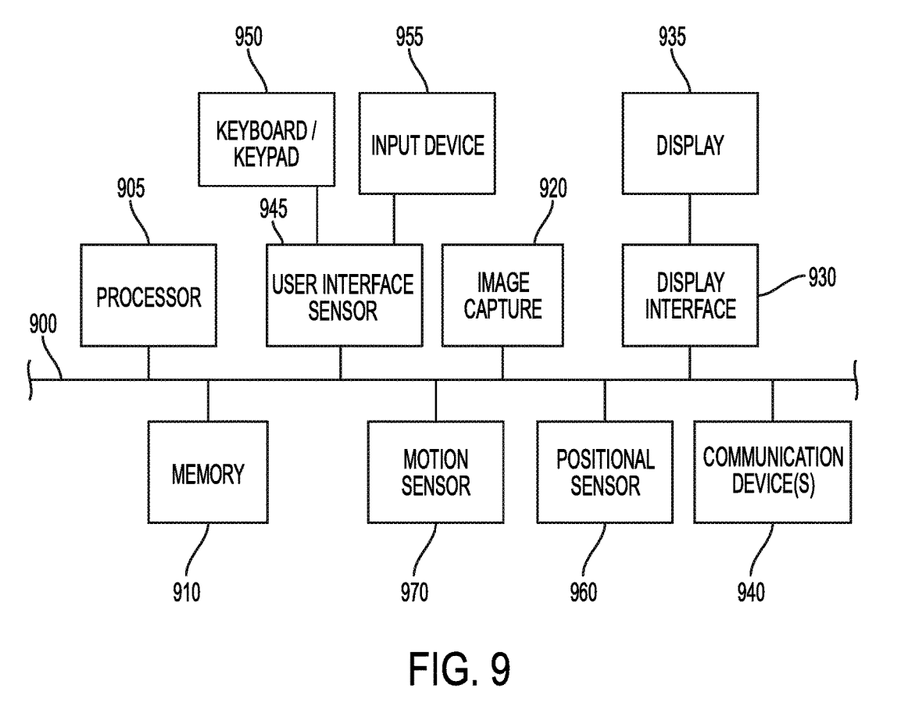
FIG. 9 illustrates various hardware components that may be included in one or more electronic devices.

FIG. 8 depicts a block diagram of hardware that may be including in any of the electronic devices described above, such as an electronic device or controller device. A bus 900 serves as an information highway interconnecting the other illustrated components of the hardware. The bus may be a physical connection between elements of the system, or a wired or wireless communication system via which various elements of the system share data. Processor 905 is a processing device of the system performing calculations and logic operations required to execute a program. Processor 905, alone or in conjunction with one or more of the other elements disclosed in FIG. 9, is an example of a processing device, computing device or processor as such terms are used within this disclosure. The processing device may be a physical processing device, a virtual device contained within another processing device, or a container included within a processing device.

A memory device 910 is a hardware element or segment of a hardware element on which programming instructions, data, or both may be stored. Read only memory (ROM) and random access memory (RAM) constitute examples of memory devices, along with cloud storage services.

An optional display interface 930 may permit information to be displayed on the display 935 in audio, visual, graphic or alphanumeric format. Communication with external devices, such as a printing device, may occur using various communication devices 940, such as a communication port or antenna. A communication device 940 may be communicatively connected to a communication network, such as the Internet or an intranet.

The hardware may also include a user input interface 945 which allows for receipt of data from input devices such as a keyboard or keypad 950, or other input device 955 such as a mouse, a touchpad, a touch screen, a remote control, a pointing device, a video input device and/or a microphone. Data also may be received from an image capturing device 920 such as a digital camera or video camera. A positional sensor 960 and/or motion sensor 970 may be included to detect position and movement of the device. Examples of motion sensors 970 include gyroscopes or accelerometers.

Examples of positional sensors 960 such as a global positioning system (GPS) sensor device that receives positional data from an external GPS network.

It is intended that the portions of this disclosure describing LED modules and control systems and methods are not limited to the embodiment of the illumination devices disclosed in this document. The LED modules, control systems and control methods may be applied to other LED illumination structures, such as those disclosed in U.S. Patent Application Pub. No. 2014/0334149 (filed by Nolan et al. and published Nov. 13, 2014), and in U.S. Patent Application Pub. No., 2015/0167937 (filed by Casper et al. and published Jun. 18, 2015), the disclosures of which are fully incorporated herein by reference.

The features and functions described above, as well as alternatives, may be combined into many other systems or applications. Various presently unforeseen or unanticipated alternatives, modifications, variations or improvements may be made by those skilled in the art, each of which is also intended to be encompassed by the disclosed embodiments.

The invention claimed is:

1. A lighting control system, comprising:
an illumination device; and
a control card comprising:
  a processor, and
  a computer-readable medium containing programming instructions that, when executed, will cause processor to:
    receive an input signal from a controller electronic device,
    identify a type of the illumination device,
    use the identified type of the illumination device to identify an output signal protocol corresponding to the illumination device,
    convert data from the input signal to an output control signal according to the identified output signal protocol, and
    transmit the output control signal to the illumination device.

2. The system of claim 1, wherein the programming instructions that, when executed, will cause the processor to identify the type of the illumination device comprise programming instructions to:
receive identifying data from the illumination device; and
use the identifying data to identify the type of the illumination device.

3. The system of claim 2, wherein the programming instructions that, when executed, will cause the processor to identify the output signal protocol corresponding to the illumination device comprise instructions to:
receive information comprising one or more of the following: a DMX address, a DMX personality, an antenna mode, or a wired input control protocol; and
also use the received information to identify the output signal protocol.

4. The system of claim 1, wherein the illumination device further comprises a port configured to removably receive the control card.

5. The system of claim 1, wherein a protocol of the input signal and the output signal protocol each comprise different protocols that are selected from the following:
a near-field communication protocol;
a short-range communication protocol;
a cellular network protocol;
analog (0-10V);
a protocol for a digital addressable lighting interface;
digital multiplex (DMX512);
DMX/RDM;
streaming ACN;
pulse width modulation;
$I^2C$; or
a protocol of a universal asynchronous receiver/transmitter device.

6. The system of claim 1, wherein the programming instructions that, when executed, will cause the processor to identify the output signal protocol corresponding to the illumination device and convert data from the input signal to an output control signal according to the identified output signal protocol comprise instructions to:
access a data set storing a plurality of rule sets for converting data between protocols; and
identify one of the rule sets that corresponds to a protocol of the input signal and the output signal protocol;
extract the identified rule set from the data set; and
execute the extracted rule set to generate the output control signal.

7. The system of claim 1, further comprising the controller electronic device, wherein the controller electronic device comprises:
a processor; and
a local or remote memory device containing programming instructions that, when executed, are configured to cause the processor of the controller electronic device to output a user interface for a control application that, responsive to commands from a user via the user interface, will include in the input signal commands to adjust one or more parameters of the illumination device.

8. The system of claim 7, wherein the programming instructions that are configured to cause the processor of the controller electronic device to output the user interface for the control application also comprise instructions to cause the controller electronic device to:
receive one or more parameter values from the illumination device; and
display the received one or more parameter values on a display of the controller electronic device.

9. The system of claim 7, wherein the programming instructions that are configured to cause the processor of the controller electronic device to output the user interface for the control application also comprise instructions to cause the controller electronic device to:
receive a credential from the user of the controller electronic device;
access a data set that includes authorization parameters for a plurality of user credentials;
retrieve the authorization parameters that correspond to the credential of the user of the controller electronic device; and
apply the authorization parameters to the control application so that the user interface only permits the user to control the illumination devices or illumination device parameters that are permitted by the authorization protocol.

10. The system of claim 1, further comprising:
the controller electronic device; and
a plurality of additional controller electronic devices that also generate input signals;
wherein at least some of the controller electronic devices generate input signals according to a communication protocols that differs from a communication protocol of the input signal from at least one other of the controller electronic devices.

11. A method of controlling a lighting system, the method comprising:

by a processor of a lighting system control card:
receiving an input signal from a controller electronic device;
identifying a type of the illumination device;
using the identified type of the illumination device to identify an output signal protocol corresponding to the illumination device;
converting data from the input signal to an output control signal according to the identified output signal protocol; and
transmitting the output control signal to the illumination device.

12. The method of claim 11, wherein identifying the type of the illumination device comprises:
receiving identifying data from the illumination device; and
using the identifying data to identify the type of the illumination device.

13. The method of claim 12, wherein identifying the output signal protocol corresponding to the illumination device comprises:
receiving information comprising one or more of the following: a DMX address, a DMX personality, an antenna mode, or a wired input control protocol; and
also using the received information to identify the output signal protocol.

14. The method of claim 11 further comprising, by the illumination device, adjusting lighting output of the illumination device by adjusting one or more parameters according to the output control signal.

15. The method of claim 11, wherein a protocol of the input signal and the output signal protocol each comprise different protocols that are selected from the following:
a near-field communication protocol;
a short-range communication protocol;
a cellular network protocol;
analog (0-10V);
a protocol for a digital addressable lighting interface;
digital multiplex (DMX512);
DMX/RDM;
streaming ACN;
pulse width modulation;
I²C; or
a protocol of a universal asynchronous receiver/transmitter device.

16. The method of claim 11, wherein identifying the output signal protocol corresponding to the illumination device and converting data from the input signal to an output control signal according to the identified output signal protocol comprise:
accessing a data set storing a plurality of rule sets for converting data between protocols; and
identifying one of the rule sets that corresponds to a protocol of the input signal and the output signal protocol;
extracting the identified rule set from the data set; and
executing the extracted rule set to generate the output control signal.

17. The method of claim 11, further comprising, by the controller electronic device:
outputting a user interface for a control application that, responsive to commands from a user via the user interface, will include in the input signal commands to adjust one or more parameters of the illumination device.

18. The method of claim 17, further comprising, by the controller electronic device:
receiving one or more parameter values from the illumination device; and
outputting the received one or more parameter values via the user interface.

19. The method of claim 17, further comprising, by the controller electronic device:
receiving a credential from the user of the controller electronic device;
accessing a data set that includes authorization parameters for a plurality of user credentials;
retrieving the authorization parameters that correspond to the credential of the user of the controller electronic device; and
applying the authorization parameters to the control application so that the user interface only permits the user to control the illumination devices or illumination device parameters that are permitted by the authorization protocol.

20. The method of claim 11 further comprising, by the processor of the lighting system control card
receiving, from a plurality of additional controller electronic devices, additional input signals;
wherein at least one of the received input signals has a communication protocol that differs from a communication protocol of at least one other received input signal.

* * * * *